US007789467B2

(12) United States Patent
Rogers et al.

(10) Patent No.: US 7,789,467 B2
(45) Date of Patent: Sep. 7, 2010

(54) BODY STIFFENING STRUCTURE FOR A SIDE DUMP TRAILER

(76) Inventors: Bobby Rogers, 610 Lakeview Dr., North Sioux City, SD (US) 57049; Ralph Rogers, 841 N. Shay Rd., Dakota Dunes, SD (US) 57049

( * ) Notice: Subject to any disclaimer, the term of this patent is extended or adjusted under 35 U.S.C. 154(b) by 256 days.

(21) Appl. No.: 12/218,946

(22) Filed: Jul. 18, 2008

(65) Prior Publication Data
US 2010/0013267 A1    Jan. 21, 2010

(51) Int. Cl.
*B60P 1/28* (2006.01)
(52) U.S. Cl. ...................................................... 298/18
(58) Field of Classification Search .................. 298/18, 298/13; 296/183.2, 183.1
See application file for complete search history.

(56) References Cited
U.S. PATENT DOCUMENTS

| | | | |
|---|---|---|---|
| 2,490,532 A * | 12/1949 | Maxon, Jr. ................... 298/22 P |
| 2,686,079 A * | 8/1954 | Kling ............................. 298/5 |
| 2,910,322 A * | 10/1959 | Magor ....................... 296/183.1 |
| 3,897,972 A * | 8/1975 | Logue ....................... 296/183.1 |
| 5,480,214 A | 1/1996 | Rogers |
| 5,662,374 A * | 9/1997 | Wheeler .................. 296/183.2 |
| 5,845,971 A | 12/1998 | Rogers |
| 5,967,615 A | 10/1999 | Rogers |
| 6,056,368 A | 5/2000 | Rogers |
| 6,089,670 A | 7/2000 | Rogers |
| 6,179,385 B1 | 1/2001 | Rogers |
| 6,199,955 B1 | 3/2001 | Rogers |
| 6,257,670 B1 | 7/2001 | Rogers |
| 6,488,340 B2 | 12/2002 | Jensen |
| 7,360,843 B1 | 4/2008 | Rogers |

* cited by examiner

*Primary Examiner*—H Gutman
(74) *Attorney, Agent, or Firm*—Dennis L. Thomte; Thomte Patent Law Office LLC

(57) ABSTRACT

The side dump trailer including a side dump body pivotally mounted on a wheeled frame and which is pivotally moveable between a transport position to at least one side dumping position. A body stiffening structure assembly is secured to the exterior surface of the side dump body and is comprised of two or more body stiffening structures welded to the exterior surface of the side dump body in a spaced-apart relationship. The body stiffening structures include elongated stiffening rails secured thereto and extending therebetween which are also welded to the side walls of the side dump body.

7 Claims, 6 Drawing Sheets

BODY STIFFENING STRUCTURE FOR A SIDE DUMP TRAILER

BACKGROUND OF THE INVENTION

1. Field of the Invention

This invention relates to a side dump trailer and more particularly to a stiffening structure for the side dump body of a side dump trailer.

2. Description of the Related Art

Side dump bodies for use on trucks and trailers have become extremely popular in recent years since the introduction of a side dump trailer of co-applicant Ralph R. Rogers, which is disclosed in U.S. Pat. No. 5,480,214. Co-applicant Ralph R. Rogers has also received U.S. Pat. Nos. 5,845,971; 5,967,615; 6,056,368; 6,089,670; 6,179,385; 6,199,955; 6,257,670; and 7,360,843 all of which relate to side dump bodies for use on trailers or trucks.

Conventional side dump bodies for use with trucks or trailers normally have a bottom wall and side walls which extend upwardly and outwardly therefrom with the forward and rearward ends of the side dump body being closed by bulkheads. In many cases, a side stiffening rail is secured to each of the upper ends of the exterior sides of the side walls to prevent undesirable flexing of the side dump bodies during the use thereof which can result in structural cracks in the side dump body. In some cases, a side stiffening angle member is also secured to the exterior of each of the side walls below the upper stiffening rail. Although the side stiffening rails used on the prior art trailers do reduce flexing of the side dump body, applicants have developed an unique stiffening structure for further reducing flexing of the side dump body during use.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A side dump trailer is disclosed which includes a wheeled frame having a forward end, a rearward end, a first side and a second side. An elongated side dump body is pivotally movably mounted on the wheeled frame and has a forward end, a rearward end and an open upper end. The side dump body includes a bottom wall portion and first and second side wall portions extending upwardly and outwardly from the bottom wall portion. The side dump body is pivotally movably mounted on the wheeled frame for movement between a transport position to at least one side dumping position.

A front body stiffening structure is secured to the exterior surfaces of the first side wall portion; the bottom wall portion and the second side wall portion of the side dump body. An intermediate stiffening body structure is secured to the exterior surfaces of the first side wall portion, the bottom wall portion and the second side wall portion rearwardly of the front body stiffening structure. A rear body stiffening structure is secured to the exterior surfaces of the first side wall portion, the bottom wall portion and the second side wall portion rearwardly of the intermediate body stiffening structure. A first elongated rail member is secured to the exterior surface of the first side wall portion and to one side of the front, intermediate and rear stiffening structures so as to extend therebetween. A second elongated rail member is secured to the exterior surfaces of the second wall portion and to the other side of the front, intermediate and rear body stiffening structures so as to extend therebetween.

In the preferred embodiment, each of the first and second rail members comprises an angle member. In the preferred embodiment, each of the body stiffening structures includes front and rear spaced-apart plates which have their inner ends secured to the exterior surfaces of the wall portions and which extend outwardly therefrom in a transverse direction with respect thereto. The front and rear plates of each of the body stiffening structures may be comprised of two pieces or may be comprised of a single piece. If the structure is a two-piece plate, the lower inner ends thereof are welded together by means of a plate secured thereto and extending therebetween.

It is therefore a principal object of the invention to provide a side dump trailer having a body stiffening structure.

A further object of the invention is to provide a body stiffening structure for a side dump trailer or the like wherein at least two-spaced apart body stiffening structures are secured to the exterior surface of the side dump body.

Still another object of the invention is to provide a body stiffening structure for a side dump trailer or the like which reduces flexing of the side dump body during use.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
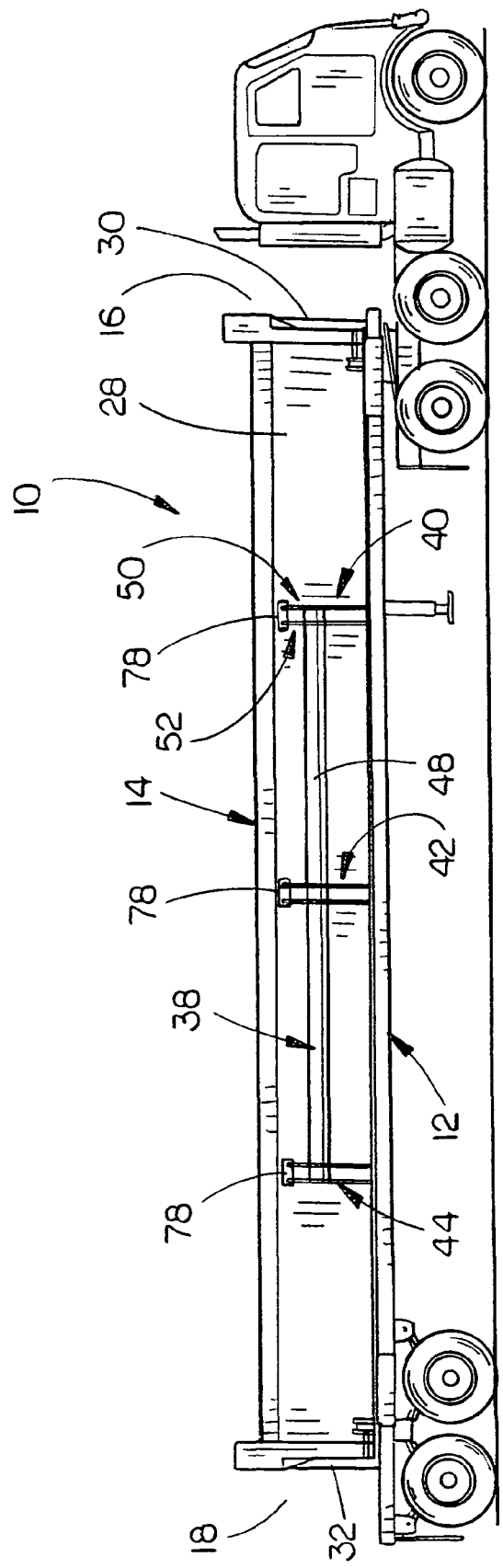
FIG. 1 is a side view of a side dump trailer with the side dump body having the body stiffening structures secured thereto.
Figure 2:
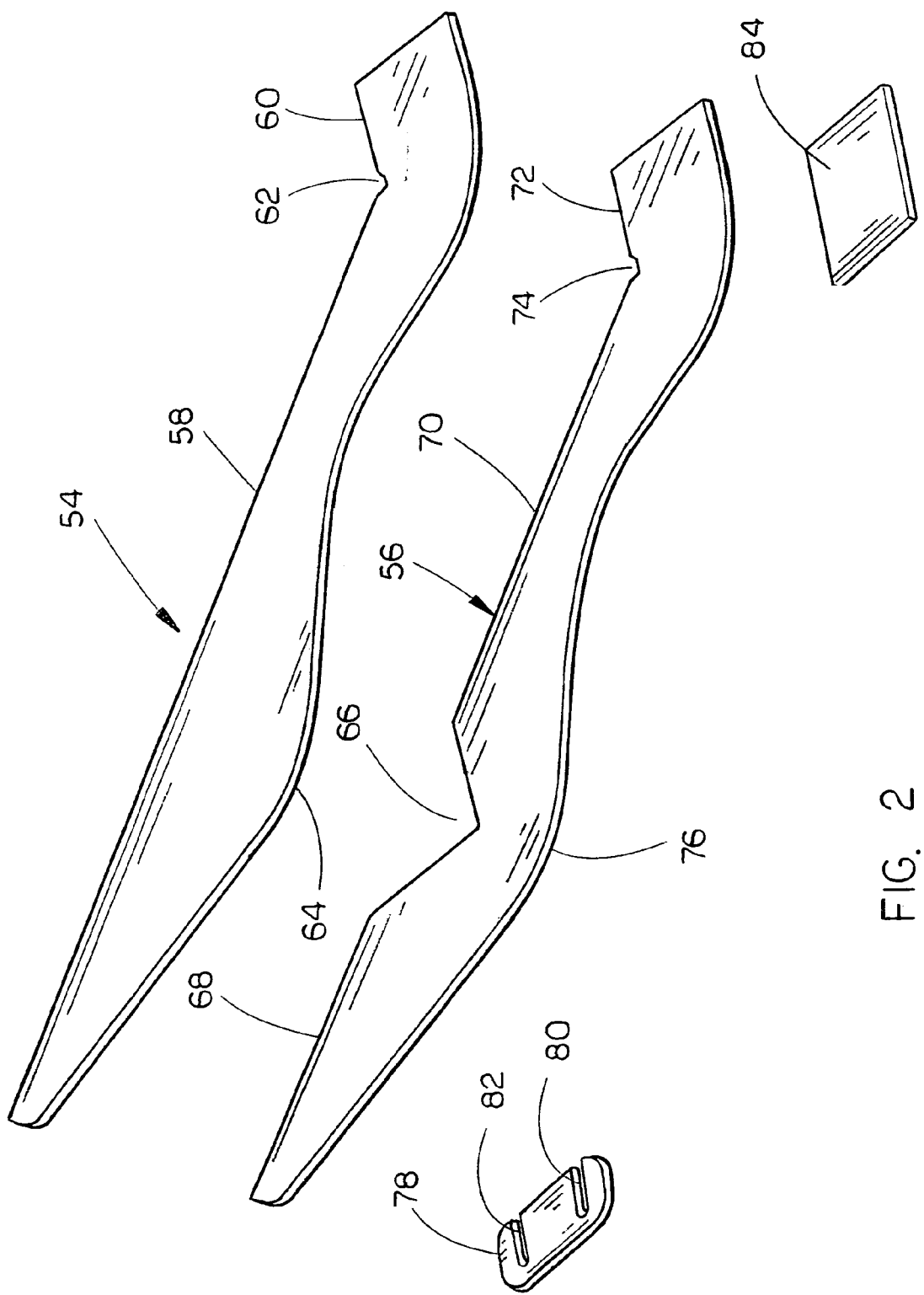
FIG. 2 is a perspective view of the two ribs, upper plate and lower plate utilized in this invention.
Figure 3:
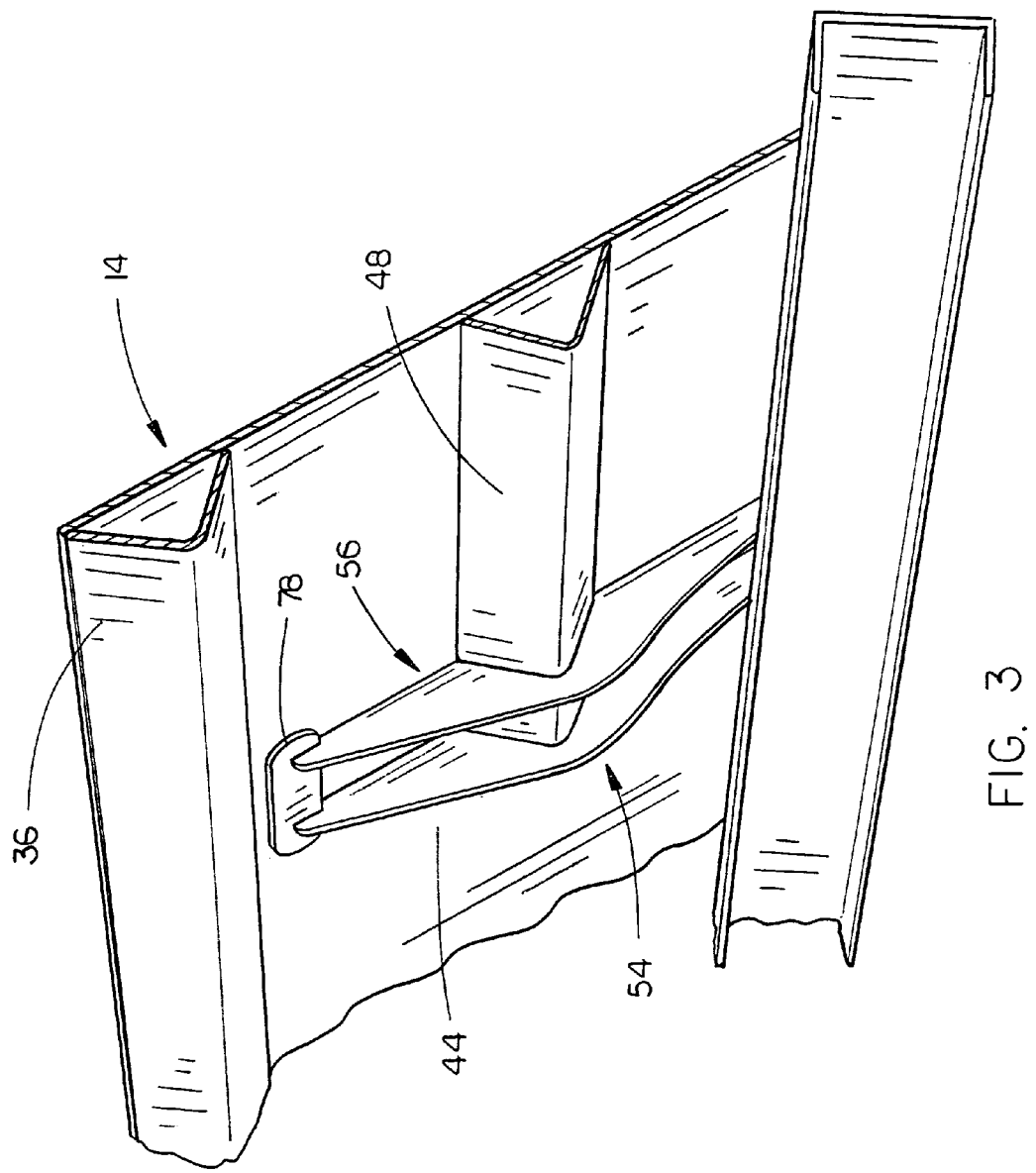
FIG. 3 is a partial perspective view illustrating one side of the rear body stiffening structure and a portion of the associated stiffening rail.
Figure 4:
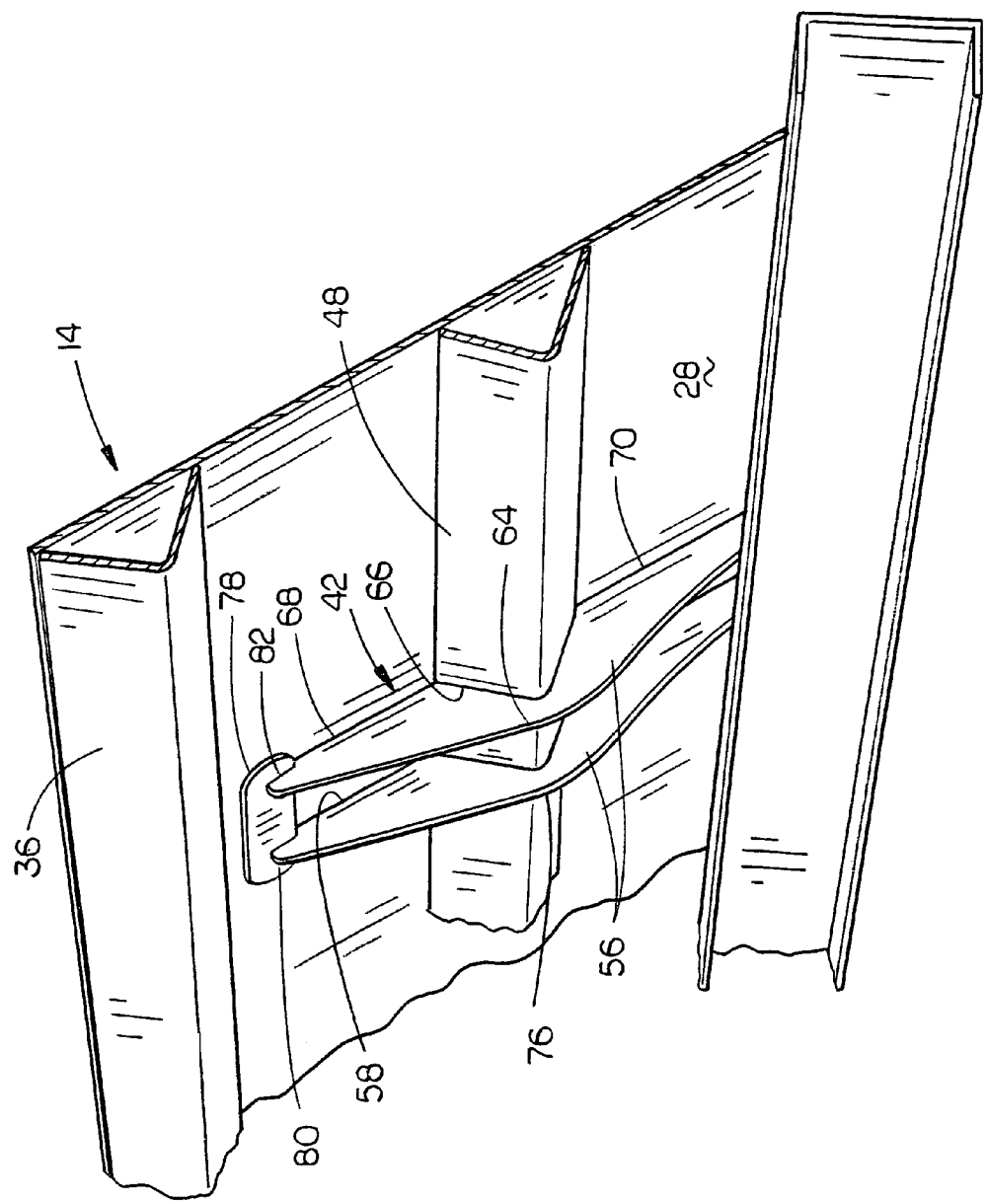
FIG. 4 is a partial perspective view illustrating one side of the intermediate body stiffening structure and a portion of the associated stiffening rail.
Figure 5:
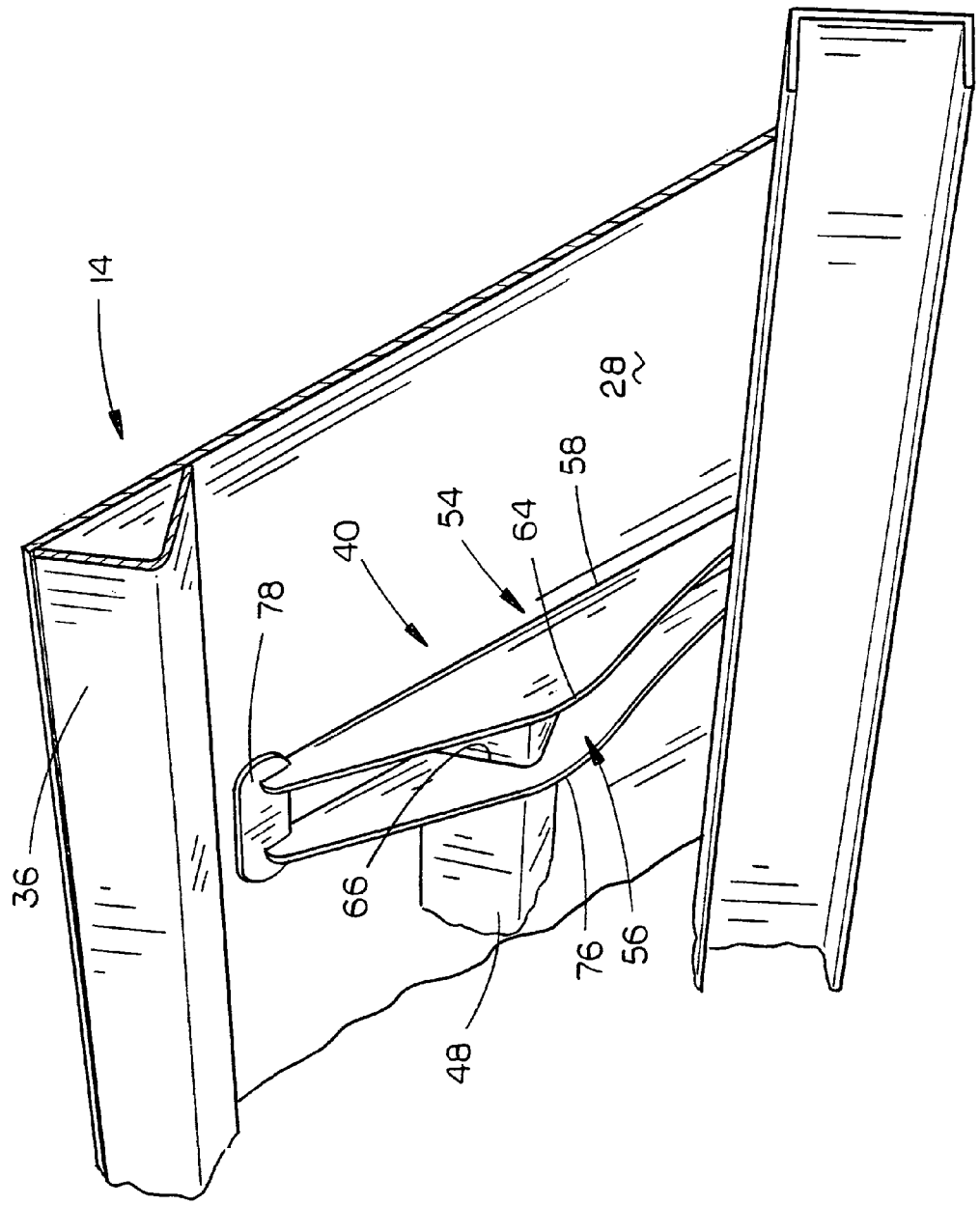
FIG. 5 is a partial perspective view illustrating one side of the front body stiffening structure and a portion of the associated stiffening rail.
Figure 6:
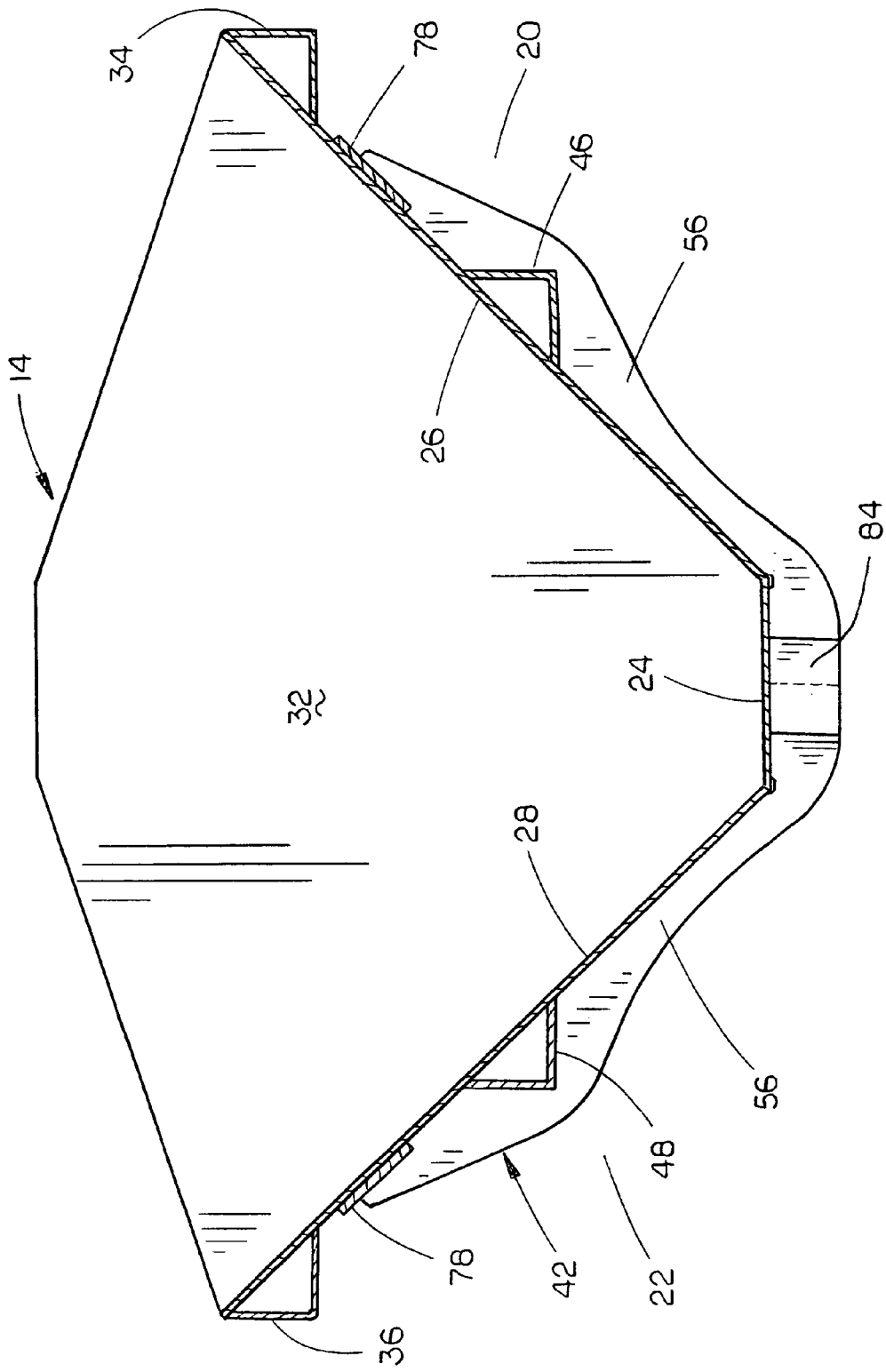
FIG. 6 is a sectional view as seen just forwardly of the front plate of the intermediate body structure.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a side dump trailer including a wheeled frame 12 of conventional design. A side dump body 14 is pivotally movably mounted on the wheeled frame 12 in conventional fashion so as to enable the side dump body 14 to be pivotally moved from a transport position to at least one side dumping position. Although a trailer is shown in the drawings, the side dump body 14 could be mounted on a truck frame. For purposes of description, the trailer 10 will be described as having a forward end 16, rearward end 18, a first side 20 and a second side 22. Side dump body 14 includes a bottom wall or bottom wall portion 24 and side wall portions 26 and 28. The bottom wall portion and the side wall portions may be formed from individual sheet members or sheet members secured together. Further, the bottom wall portion, side wall portion 26 and side wall portion 28 could be of one-piece construction. Bulkheads 30 and 32 close the forward and rearward ends of the side dump body 14 respectively. As stated, the side dump body 14 is pivotally mounted on the wheeled frame 12 so as to be pivotally moveable between a transport position to at least one side dumping position in conventional fashion, usually by one or more hydraulic cylinders which may be located at opposite ends of the side dump body or along the length of the side dump body. The side dump body 14 will normally have a strengthening or stiffening rail 34 secured to the upper end of the side wall portion 26 and will have a strengthening or stiffening rail 36 mounted at the upper end of side wall portion 28.

The numeral 38 refers to a stiffening structure assembly which is secured to the exterior surface of the side dump body 14 and which is comprised of a front body stiffening structure 40, and intermediate body stiffening structure 42 and rear stiffening structure 44 as well as elongated stiffening rail members 46 and 48 as will be described in more detain hereinafter. Although three body stiffening structures 40, 42 and 44 are illustrated, which is the preferred embodiment, any number of body stiffening structures greater than two may be utilized.

Front body stiffening structure 40 includes a front rib assembly 50 and a rear rib assembly 52. Front rib assembly 50 is comprised of a pair of ribs 54 while rear rib assembly 52 is comprised of a pair of ribs 56. Intermediate body stiffening structure 42 is comprised of two pairs of ribs 56, with each pair of ribs 56 defining a front rib assembly and a rear rib assembly. Rear body stiffening structure 44 is comprised of a pair of ribs 56 positioned at the forward end thereof to define a front rib assembly and a pair of ribs 54 located at the rearward end thereof to define a rear rib assembly.

Each of the ribs 54 includes a straight edge portion 58 which is adapted to engage the exterior surface of one of the side wall portions 20 or 22 and a lower straight edge portion 60 which is adapted to engage the exterior surface of the bottom wall portion 24. A small radius 62 is formed in rib 54 at the juncture of edges 58 and 60. The outer side of the rib 54 is provided with a radius section 64.

Each of the ribs 56 are identical to the ribs 54 except for an angular cut out portion 66 being formed therein adapted to receive one of the rail members 46 or 48. For purposes of description, each of the ribs 56 will be described as having straight edge portions 68, 70 and 72, radius 74 and radius 76.

Six flat oval plates 78 are secured to the exterior surface of side wall portions 26 and 28 at the upper ends of the opposite sides of the body stiffening structures 40, 42 and 44. The lower ends of each of the flat plates 78 have a pair of slots 80 and 82 formed therein adapted to receive the upper inner ends of the ribs as will be described hereinafter.

The front rib assembly 50 of front stiffening structure 40 is comprised of a pair of the ribs 54 positioned at the exterior surface of the side dump body with the upper inner ends thereof being received by the slots 82 in the flat plates 78. The ribs 54 are welded to the flat plates 78 and to the exterior surface of the side wall portions 26 and 28 and the bottom wall portion 24 with the edge portions 60 of the ribs 54 being welded to side wall portions 26 and 28 and the straight edge portion 60 being welded to the exterior surface of bottom wall portion 24. A plate 84 is welded to the lower inner end portions of the ribs 54 and is welded to the bottom wall portion 24. Although it is preferred that a pair of ribs 54 serve as the front rib assembly 50 of front body stiffening structure 40, the pair of ribs 54 could be of one-piece construction which would eliminate the need for a plate 84. The same is true of the other rib assemblies to be described hereinafter.

The rear rib assembly 52 of front body stiffening structure 40 is comprised of a pair of the ribs 56 which are welded to exterior surface of the side dump body in the same manner as ribs 54 are welded. The notches or cut-outs 66 of the ribs 56 receive one of the rails 34 and 36 with the rib 56 being welded to the rail member 46 or 48. The rail members 46 and 48 will have been previously welded to the exterior surfaces of the side wall portions 26 or 28. The forward ends of the rail members 46 and 48 abut against the rearward surface of the ribs 54 of the front rib assembly 50 of front stiffening structure 40 and are welded thereto.

The intermediate stiffening structure 42 is comprised of two pairs of spaced-apart ribs 56 which are welded to the exterior surface of the side wall portions 26 or 28, to the rail members 46 or 48, to the bottom wall portion 24 and to the plates 78. See lower inner ends of the ribs 56 are welded together with plate 78 as previously described.

Rear body stiffening structure 44 is comprised of a pair of ribs 56 positioned forwardly of a pair of ribs 54 and which are secured to the side dump body in the same manner as that previously described. The rearward ends of the rail members 46 and 48 abut against the ribs 54 of the rear rib assembly and is welded thereto. In all of the stiffening structures 40, 42 and 44, the lower inner ends of the ribs 54 or 56 are joined together by a plate 84 welded thereto.

In use, the stiffening body structure assembly 38 adds rigidity and strength to the side dump body to prevent twisting or bending of the side dump body thereby reducing the possibility of cracks forming in the weldments of the side dump body. Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. In combination:

a wheeled frame means having a forward end, a rearward end, a first side and a second side;

an elongated side dump body movably mounted on said wheeled frame means and having a forward end, a rearward end and an open upper end;

said side dump body having a bottom wall portion and first and second side wall portions extending upwardly and outwardly from said bottom wall portion;

each of said wall portions having interior and exterior surfaces;

said first and second side wall portions having upper ends;

said side dump body being pivotally movably mounted on said wheeled frame means from a transport position to at least one side dumping position;

a front body stiffening structure secured to said exterior surfaces of said first side wall portion, said bottom wall portion and said second side wall portion;

an intermediate body stiffening structure secured to said exterior surfaces of said first side wall portion, said bottom wall portion and said second side wall portion;

said intermediate body stiffening structure being positioned rearwardly of said front stiffening structure;

a rear body stiffening structure secured to said exterior surfaces of said first side wall, said bottom wall portion and said second side wall portion;

a first elongated rail member secured to said exterior surface of said first side wall portion and to said front, intermediate and rear stiffening structures so as to extend therebetween;

a second elongated rail member secured to said exterior surface of said second side wall portion and to said front, intermediate and rear stiffening structures so as to extend therebetween;

each of said front body stiffening structure, said intermediate body stiffening structure and said rear body stiffening structure comprising a front plate, having inner and outer ends, and a rear plate having inner and outer ends;

said front and rear plates being horizontally spaced from one another;

said front and rear plates being secured at their inner ends to said first side wall portion, said bottom wall portion and said second wall portion and extending outwardly therefrom so as to be transversely disposed with respect to said first side wall portion, said bottom wall portion and said second side wall portion.

2. The combination of claim 1 wherein each of said rail members having forward and rearward ends; said forward ends of said first and second rail members abutting said front plate of said front stiffening structure; said rearward ends of said first and second rail members abutting said rear plate of said rear stiffening structure; said first and second rail members passing through said rear plate of said front stiffening structure, said front and rear plates of said intermediate stiffening structure and said front plate of said rear stiffening structure.

3. The combination of claim 2 wherein said stiffening structures are secured to a flat plate which is secured to said exterior surface of the respective side wall portion.

4. The combination of claim 2 wherein said stiffening structures have upper ends which are disposed below said upper ends of said first and second side wall portions.

5. The combination of claim 4 wherein said upper ends of said stiffening structures are secured to a flat plate which is secured to said exterior surface of the respective side wall portion.

6. A wheeled frame means having a forward end, a rearward end, a first side and a second side;

an elongated side dump body movably mounted on said wheeled frame means and having a forward end, a rearward end and an open upper end;

said side dump body having a bottom wall portion and first and second side wall portions extending upwardly and outwardly from said bottom wall portion;

each of said first side wall portion, said bottom wall portion and said bottom wall portion having interior and exterior surfaces;

each of said first and second side wall portions having upper ends;

said side dump body being pivotally movably mounted on said wheeled frame means from a transport position to at least one side dumping position;

a front body stiffening structure secured to said exterior surface of said first side wall portion, said bottom wall portion and said second side wall portion;

a rear body stiffening structure secured to said exterior surfaces of said first side wall portion, said bottom wall portion and said second side wall portion;

a first elongated rail member secured to said exterior surface of said first side wall portion and to said front and rear stiffening structures so as to extend therebetween; and a second elongated rail member secured to said exterior surface of said second side wall portion and to said front and rear stiffening structures so as to extend therebetween;

each of said front and rear body stiffening structures comprising a front plate having inner and outer ends and a rear plate having inner and outer ends;

said front and rear plates being horizontally spaced from one another;

said front and rear plates being secured at their inner ends to said first and second side wall portions and said bottom wall portion and extending outwardly therefrom so as to be transversely disposed with respect to said first and second side wall portions and said bottom wall portion.

7. The combination of claim 6 wherein each of said rail members have forward and rearward ends; said forward ends of said first and second rail members abutting said front plate of said front stiffening structure; said rearward ends of said first and second rail members abutting said rear plate of said rear stiffening structure; said first and second rail members passing through said rear plate of said front stiffening structure and through said front plate of said rear stiffening structure.

* * * * *